United States Patent
Kasahara

(10) Patent No.: US 9,525,792 B2
(45) Date of Patent: Dec. 20, 2016

(54) IMAGE READING APPARATUS, METHOD FOR CONTROLLING IMAGE READING APPARATUS, AND STORAGE MEDIUM

(71) Applicant: CANON KABUSHIKI KAISHA, Tokyo (JP)

(72) Inventor: Aya Kasahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/800,550

(22) Filed: Jul. 15, 2015

(65) Prior Publication Data

US 2016/0028902 A1   Jan. 28, 2016

(30) Foreign Application Priority Data

Jul. 23, 2014   (JP) .................................. 2014-149936

(51) Int. Cl.
*H04N 1/04* (2006.01)
*H04N 1/00* (2006.01)

(52) U.S. Cl.
CPC .................................. *H04N 1/0057* (2013.01)

(58) Field of Classification Search
CPC .................................................... H04N 1/0057
USPC .................................. 358/1.2, 474, 498, 497
See application file for complete search history.

(56) References Cited

U.S. PATENT DOCUMENTS

| 9,060,086 | B2* | 6/2015 | Takahashi | .......... H04N 1/00578 |
| 2014/0211277 | A1* | 7/2014 | Ozaki | ................ H04N 1/00588 358/496 |

FOREIGN PATENT DOCUMENTS

| JP | 2000-314991 A | 11/2000 |
| JP | 2002-060089 A | 2/2002 |

* cited by examiner

*Primary Examiner* — Houshang Safaipour
(74) *Attorney, Agent, or Firm* — Canon USA, Inc., IP Division

(57) ABSTRACT

An image reading apparatus includes a reading unit that reads an image on a document, a document conveyance unit that conveys the document to the reading unit, a first identification unit that identifies a size of the document before the document begins to be conveyed, a reading control unit that controls the reading unit to read the document, based on the size identified by the first identification unit, and a second identification unit that identifies a size of the document after the document begins to be conveyed, wherein the reading control unit performs control to, in a case where the size identified by the first identification unit is smaller than the size identified by the second identification unit, cancel reading processing, and in a case where the size identified by the first identification unit is greater than the size identified by the second identification unit, continue the reading processing.

11 Claims, 10 Drawing Sheets

FIG.4

| SENSOR | | A3 LONG | A4 | B4 LONG | B5 | A4R | A5 | B5R | B6 | A5R |
|---|---|---|---|---|---|---|---|---|---|---|
| WIDTH DETECTION SENSOR | WIDTH > 263.5 mm | ● | — | — | — | — | — | — | — | — |
| | 263.5 mm ≥ WIDTH > 213.9 mm | — | ● | ● | ● | — | — | — | — | — |
| | 213.9 mm ≥ WIDTH > 196 mm | — | — | — | — | ● | ● | — | — | — |
| | 196 mm ≥ WIDTH > 165 mm | — | — | — | — | — | — | ● | ● | — |
| | 165 mm ≥ WIDTH | — | — | — | — | — | — | — | — | ● |
| SENSOR 302 | | ON | OFF | ON | OFF | OFF | OFF | OFF | OFF | OFF |
| SENSOR 303 | | ON | OFF | ON | OFF | ON | OFF | ON | OFF | OFF |

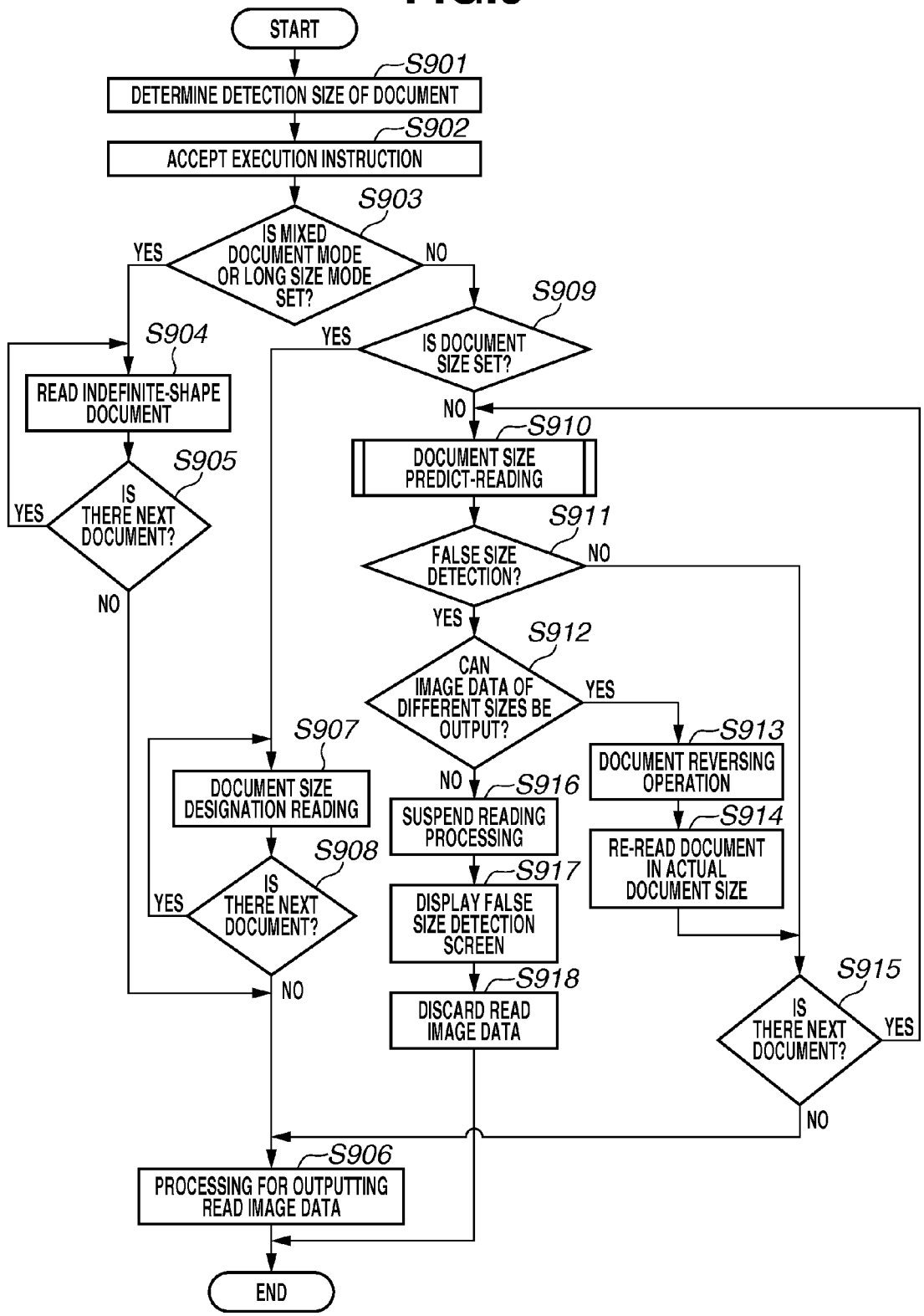

IMAGE READING APPARATUS, METHOD FOR CONTROLLING IMAGE READING APPARATUS, AND STORAGE MEDIUM

BACKGROUND

Field

Aspects of the present invention generally relate to an image reading apparatus that conveys a document and generates and processes image data.

Description of the Related Art

An image reading apparatus having a document feeding-reading function for reading a document placed on a document conveyance unit (auto document feeder (ADF)) is known.

It is known that such an image reading apparatus is configured to make the user set in advance the size of a document to be read, and read the document placed on a document stacking unit in a standard size set by the user. As a method for previously detecting the size of a document placed on the document stacking unit of the ADF by using a document detection sensor, a method for automatically setting the size of a document to be read (Japanese Patent Application Laid-Open No. 2000-314991) is known. Japanese Patent Application Laid-Open No. 2000-314991 discusses a mode (normal mode) of reading a document in a standard size detected by the document detection sensor.

Calculating the length of a document in a conveyance direction in the middle of a document conveyance path has also been known (Japanese Patent Application Laid-Open No. 2002-060089).

If the size of a document to be read is automatically detected by the document detection sensor to read a document of standard size, the size of the actual document may differ from the size of the document detected by the document detection sensor. Specifically, if a document in a curled state (hereinafter, a curled document) or a document in a folded state (hereinafter, a Z-folded document) is placed on the document stacking unit, the document detection sensor can falsely detect the size of the document. A possible reason is that when the sensor in used is configured to detect the presence or absence of a document, if the curled or folded portion of the document floats above the document stacking unit, the sensor may fail to detect that portion.

If a plurality of documents of different sizes is placed on the document stacking unit, the document detection sensor may detect the document size of a document different from one about to be read. The reason is that if a plurality of documents of different sizes is stacked and placed and the sensor for detecting the presence or absence of a document is used to detect the document size, the detection result depends on the maximum document size.

False size detection on the document stacking unit can be determined based on the length of the document in the conveyance direction in the middle of the document conveyance path. For example, if a control unit determines that the result of the document detection sensor is different from the result calculated in the middle of the conveyance path, the control unit can cancel the read job and notify an error message.

If the document detection sensor falsely detects a size smaller than that of the actual document, image data is generated in which a part of the actual document is missing. Accordingly, error processing needs to be performed when a false detection occurs. On the other hand, if the document detection sensor falsely detects a size larger than the document size, the reading area is larger than the actual document size and the image data including the entire image on the document can be generated. Nevertheless, the error processing is conventionally performed every time a false size detection occurs. The user's convenience has been rather impaired since the job is cancelled even if the document detection sensor falsely detects a size greater than the document size.

SUMMARY

Aspects of the present invention are generally directed to providing a mechanism that improves the user's convenience by performing different processes between a case where the size of a document identified before a start of conveyance is greater than the size identified after the start of conveyance, and a case where the size of the document identified before the start of conveyance is smaller than the size identified after the start of conveyance.

According to an aspect of the present invention, an image reading apparatus includes a reading unit configured to read an image on a document to generate image data, a document conveyance unit configured to convey the document to the reading unit, a first identification unit configured to identify a size of the document before the document conveyance unit begins conveying the document, a reading control unit configured to control the reading unit to read the document, based on the size identified by the first identification unit, and a second identification unit configured to identify a size of the document after the document conveyance unit begins conveying the document, wherein the reading control unit is configured to perform control to, in a case where the size identified by the first identification unit is smaller than the size identified by the second identification unit, cancel reading processing, and in a case where the size identified by the first identification unit is greater than the size identified by the second identification unit, continue the reading processing.

Further features of the present disclosure will become apparent from the following description of exemplary embodiments with reference to the attached drawings.

BRIEF DESCRIPTION OF THE DRAWINGS

FIG. 4 is a diagram illustrating a data model of a condition table.

FIG. 9 is a flowchart illustrating operations related to reading processing of an MFP.

DESCRIPTION OF THE EMBODIMENTS

Exemplary embodiments will be described in detail below with reference to the drawings. It should be noted that the following exemplary embodiments are not seen to be limiting, and not all combinations of features described in the exemplary embodiments are necessarily required.

Figure 1:
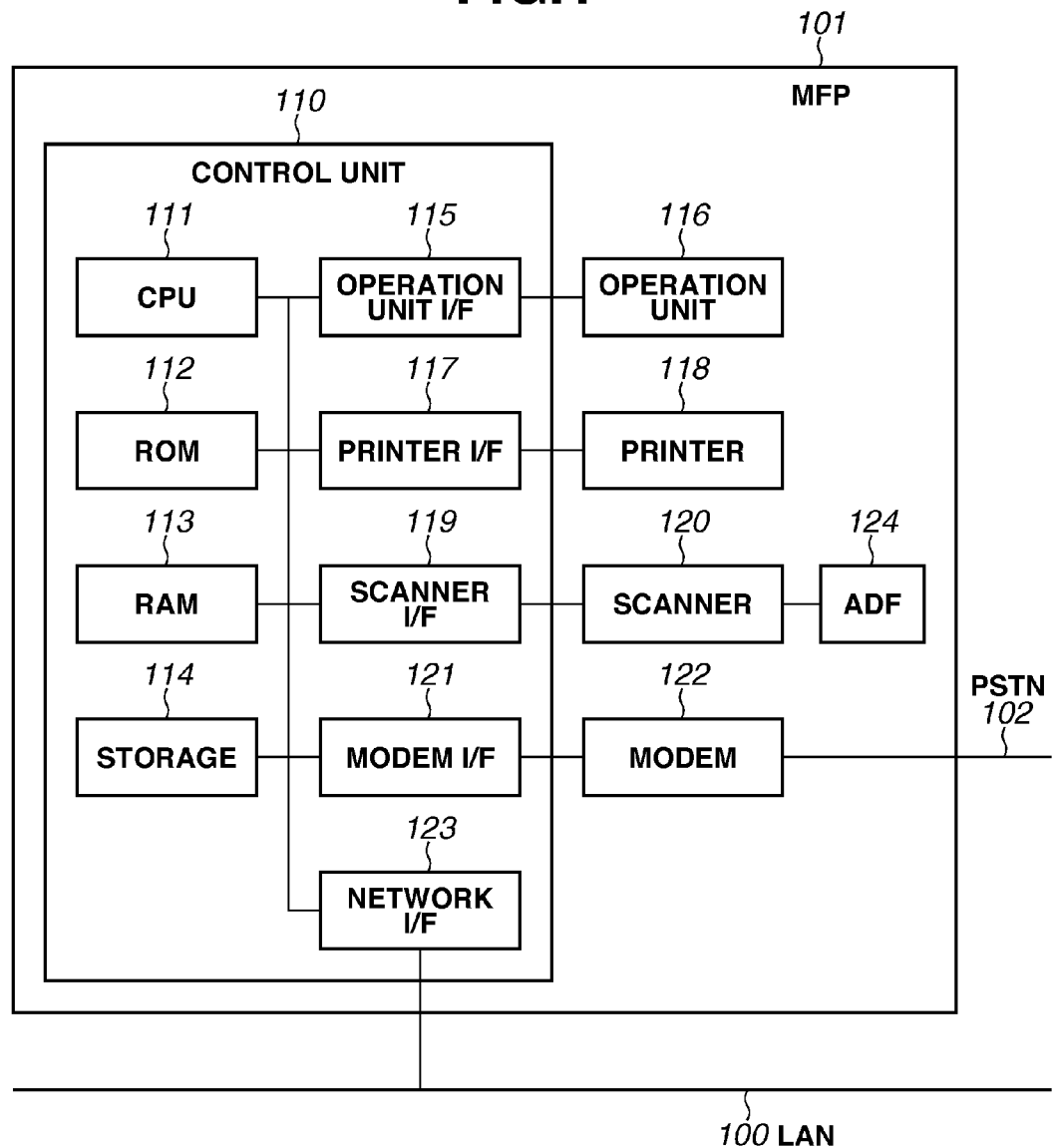
FIG. 1 is a block diagram illustrating a configuration of a multi function peripheral (MFP).

A first exemplary embodiment will initially be described. FIG. 1 is a block diagram illustrating a hardware configuration of an MFP 101. The MFP 101 is an example of an image reading apparatus. While the present exemplary embodiment is described by using an MFP as an example of the image reading apparatus, an image reading apparatus other than an MFP may be employed as long as the image reading apparatus conveys a document and generates image data. For example, a single-function scanner apparatus can also be employed.

A control unit 110 including a central processing unit (CPU) 111 controls an operation of the entire MFP 101. The CPU 111 reads a control program stored in a read-only memory (ROM) 112 or a storage 114 and performs various controls such as a reading control and a transmission control. A random access memory (RAM) 113 is a main storage memory of the CPU 111. The RAM 113 is used as a work area and a temporary storage area for loading the control program stored in the storage 114. The storage 114 stores image data, various programs, various types of history information, and various types of setting information. In the present exemplary embodiment, the storage 114 is an auxiliary storage device such as a hard disk drive (HDD). However, a flash disk and other nonvolatile storages, typified by a solid state drive (SSD) may be used.

The MFP 101 is configured such that a single CPU 111 performs processing illustrated in the flowcharts to be described below by using one memory (RAM 113), whereas other configurations may be employed. For example, a plurality of CPUs, RAMs, ROMs, and storages may cooperate to perform the processing illustrated in the flowcharts to be described below. Hardware circuits such as an application specific integrated circuit (ASIC) and a field-programmable gate array (FPGA) may be used to perform part of the processing.

An operation unit interface (I/F) 115 connects an operation unit 116 and the control unit 110. The operation unit 116 includes a liquid crystal display unit having a touch panel function, and a keyboard. The operation unit 116 functions as an acceptance unit for accepting a user's instructions and a display unit for displaying information to the user. The control unit 110 cooperates with the operation unit 116 to perform a notification control of various types of information to the user and an acceptance control of the user's instructions.

A printer I/F 117 connects a printer 118 and the control unit 110. Image data to be printed by the printer 118 is transferred from the control unit 110 to the printer 118 via the printer I/F 117, whereby an image based on the image data is printed on a sheet such as a sheet of paper.

A scanner I/F 119 connects a scanner 120 and the controller 110. The scanner 120 reads an image on a document placed on a document stacking unit 202 of an ADF (document conveyance unit) 124 or a document placed on a document positioning glass plate 2001, and generates image data (image file). The image data generated by the scanner 120 is transferred to the storage 114 of the control unit 110 via the scanner I/F 119.

Figure 2:
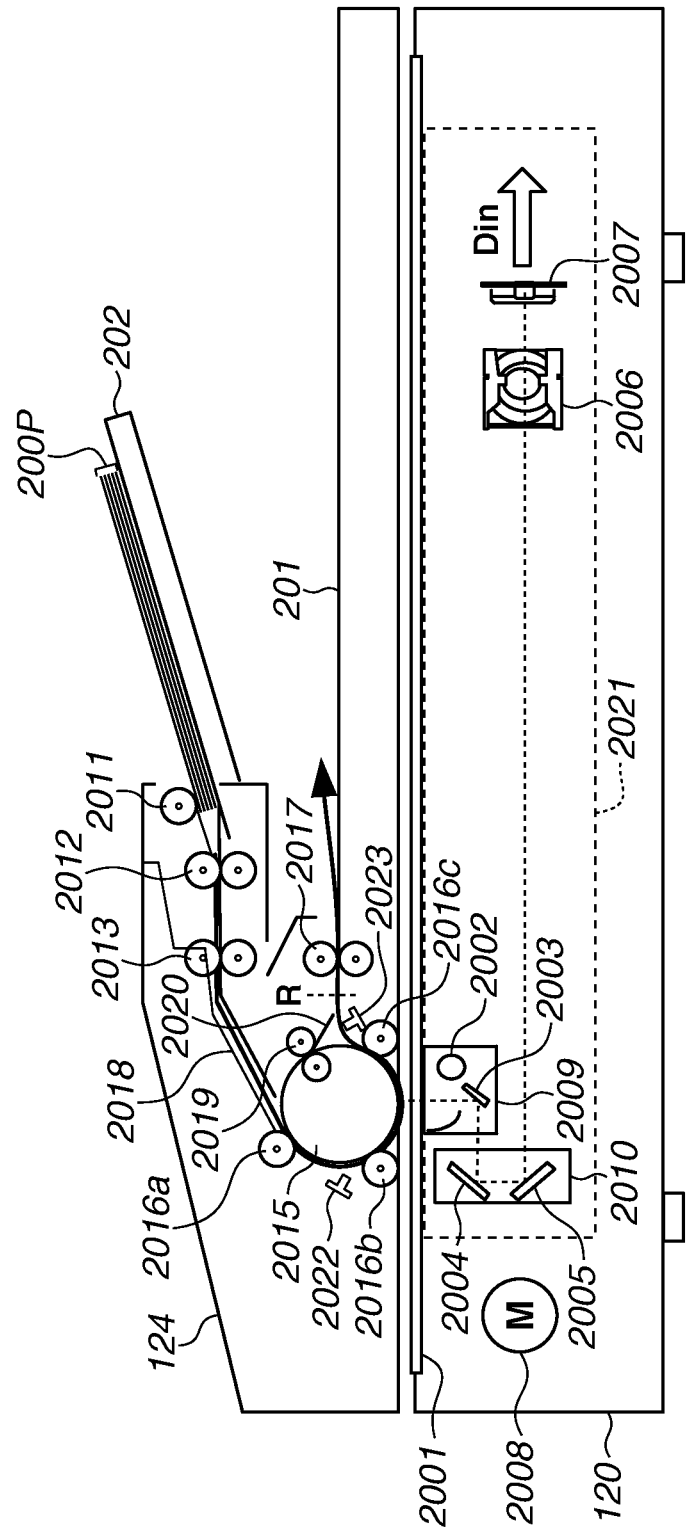
FIG. 2 is a sectional view illustrating a scanner.

FIG. 2 is a sectional view illustrating the scanner 120. A conveyance operation and a reading operation when reading a document stack 200P placed on the document stacking unit 202 (hereinafter, feeding-reading) will be described with reference to FIG. 2. Processing of the conveyance operation and the reading operation described with reference to FIG. 2 is implemented by the CPU 111 in cooperation with one or more control CPUs (not illustrated) for controlling the scanner 120.

<Conveyance Operation by ADF>

The ADF 124 includes a feed roller 2011, a separation and conveyance roller 2012, a registration roller 2013, a guide plate 2018, a conveyance drum 2015, driven rollers 2016a, 2016b, and 2016c, a discharge roller 2017, a reversing roller 2019, a flapper 2020, a sensor 2022, a sensor 2023, the document stacking unit 202, and a document discharge unit 201.

The document stack 200P is a stack of documents to be read. The document stack 200P is placed on the document stacking unit 202 by the user. A driving source (not illustrated) rotates the feed roller 2011 to feed the document stack 200P placed on the document stacking unit 202 toward the separation and conveyance roller 2012. The separation and conveyance roller 2012 separates and conveys a sheet from the conveyed document stack 200P toward the registration roller 2013. The registration roller 2013 starts to rotate at a time when the conveyance of the document starts, and conveys the document toward an optical unit 2009. Driving sources for driving the feed roller 2011, the separation and conveyance roller 2012, and the registration roller 2013 include, for example, a stepping motor.

The document discharged from the registration roller 2013 travels along the guide plate 2018 and is held between the conveyance drum 2015 of large diameter, which is rotated by a conveyance motor, and the driven rollers 2016a, 2016b, and 2016c. The document is conveyed along the outer periphery of the conveyance drum 2015, once passed over a surface of the document positioning glass plate 2001, and conveyed in the direction of the arrow in FIG. 2 at constant speed. The document is read by a reading unit 2021 when passing over the surface of the document positioning glass plate 2001. The image-read document continues to be conveyed along the outer periphery of the conveyance drum 2015 at constant speed, and is discharged onto the discharge unit 201 by the discharge roller 2017.

If the scanner 120 reads a two-sided document, the image-read document is not discharged and reversed to read the back side. The control CPU detects a trailing edge of the document by using the sensor 2023 which is arranged on the conveyance path of the ADF 124. After the detection, the control CPU conveys the document to a reversing position R and then stops the conveyance motor. Next, the control CPU drives the conveyance roller to rotate reversely, whereby the document is conveyed again in a reversed conveyance direction. The document is fed along the flapper 2020 toward the reversing roller 2019, and is passed over the surface of the document positioning glass plate 2001 along the outer periphery of the conveyance drum 2015. The back side is read by the reading unit 2021 described below when passing over the surface of the document positioning glass plate 2001.

In such a feeding-reading operation, an operation for reading each document of the document stack 200P placed on the document stacking unit 202 and discharging the sheet to the discharge unit 201 can be repeated to continuously read a plurality of documents.

The present exemplary embodiment deals with the case of reversing a document to read both sides. However, this is not restrictive. For example, if the MFP 101 includes reading units on both the document conveyance side and the document positioning glass plate side, a two-sided document may be read by one conveyance pass.

<Reading of Image Data by Reading Unit>

The reading unit 2021 includes the optical unit 2009, a mirror unit 2010, a lens 2006, and a charge-coupled device (CCD) image sensor 2007. The reading unit 2021 irradiates a document with light by using the optical unit 2009, and reads the reflected light by the CCD image sensor 2007.

In a feeding-reading operation, the reading unit 201 performs image reading when a document passes over the surface of the document positioning glass plate 2001 as described above. Before feeding-reading, the scanner 120 moves the optical unit 2009 and the mirror unit 2010 to the positions illustrated in FIG. 2 by using a motor 2008.

To detect the timing of reading a document, the control CPU detects a leading edge of the document by using the sensor 2022 which includes a photocoupler. The control CPU starts to count a driving clock of the conveyance motor that serves as a driving source of the conveyance drum 2015 and the driven rollers 2016a, 2016b, and 2016c, at the timing that the sensor 2022 detects the leading edge of the document and turns ON. Amounts of movement of a document by the conveyance drum 2015 and the driven rollers 2016a, 2016b, and 2016c per driving clock are the same. How far the document is conveyed (i.e., where the position of the leading edge of the document is) can thus be measured by counting the driving clock from the timing that the sensor 2023 turns ON. By using the measurement result, the reading unit 2021 starts reading an image on the document at timing that the leading edge of the document conveyed from the document stacking unit 202 reaches a document reading position of the document positioning glass plate 2001.

When it comes to the timing to start reading the document, the scanner 102 turns on an illumination lamp 2002 and irradiates the document passing over the surface of the document positioning glass plate 2001 at constant speed with light. The reflected light from the document here is incident on the lens 2006 via mirrors 2003, 2004, and 2005, and focused on the CCD image sensor 2007. The CCD image sensor 2007 converts the reflected light from the document into an electrical signal. The electrical signal is converted into digital data (image data) by a not-illustrated analog-to-digital (A/D) converter, and stored into the storage 114 or the RAM 113 of the control unit 110.

In the present exemplary embodiment, a bar-shaped light source is used as the illumination lamp 2002. A reading line is set to be in parallel with the longitudinal direction of the illumination lamp 2002. The document is conveyed in a direction orthogonal to the reading line while generating image data. A direction parallel to the reading line will be defined as a main scanning direction. The direction orthogonal to the reading line (document conveyance direction) will be defined as a sub scanning direction.

The CPU 111 calculates a document length based on the time needed for the leading edge and the trailing edge of the document to pass the sensor 2022, and a conveyance speed of the document. For example, the control CPU obtains the number of driving clocks measured between the timing that the sensor 2022 detects the leading edge of the document and turns ON, and the timing that the sensor 2022 turns OFF. The CPU 111 or the control CPU multiplies the obtained driving clocks by the amount of movement of the document by the conveyance drum 2015 and the driven rollers 2016a, 2016b, and 2016c per driving clock to calculate the document length of the document.

In the present exemplary embodiment, the document length on the conveyance path of the ADF 124 is calculated by the foregoing method. However, this is not restrictive. For example, processing for correcting the document length may be performed in consideration of a slide of the document during conveyance, components accuracy of the conveyance roller 2012 and the document conveyance path, and meandering of the document inside the document conveyance path. The document length may be calculated by other units. Further, a plurality of sensors may be used to calculate a document size in the conveyance path of the ADF 124.

Unlike the foregoing feeding-reading operation, a document to be read may be placed and read on the document positioning glass plate 2001. In such a method, the optical unit 2009 is moved to scan the document placed on the document positioning glass plate 2001. The reflected light from the document here is also read and converted into image data by the CCD image sensor 2007.

Return to the description of FIG. 1. The MFP 101 can transfer the image data generated by the scanner 120 to the printer 118 to carry out printing (copy function). The MFP 101 can also transmit the image data generated by the scanner 120 by using various transmission protocols (transmission function). The MFP 101 can save the image data generated by the scanner 120 into a storage area which is readable and writable by the CPU 111 (save function).

The control unit 110 is connected to a local area network (LAN) 100 via a network I/F 123. The network I/F 123 transmits image data and information to an external apparatus (such as a mail server, a file server, and a personal computer (PC)) on the LAN 100, and receives information from an external apparatus on the LAN 100. The control unit 100 is connected to a modem 122 via a modem I/F 121. The modem 122 performs facsimile transmission and reception with a not-illustrated facsimile apparatus via the public switched telephone network (PSTN) 102.

<Detection of Standard Size>

Figure 3:
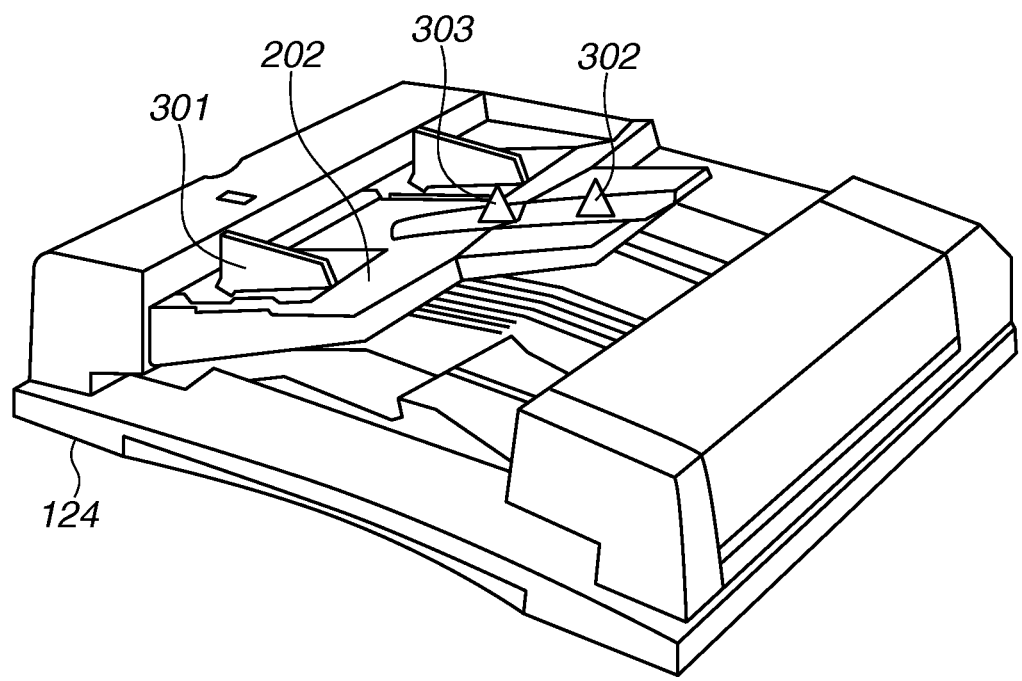
FIG. 3 is a diagram illustrating an appearance of the scanner.

Next, a method for detecting a size of a document placed on the document stacking unit 202 will be described. FIG. 3 is a perspective view illustrating the document stacking unit 202 of the scanner 120. A document guide 301 (hereinafter, guide 301) is a guide that the user uses to align documents in width when placing a document stack on the document stacking unit 202. A width detection sensor (not illustrated) operates in an interlocked manner with the guide 301, and detects the width of the documents to be read by the reading unit 2021 in the main scanning direction (main scanning width) according to the position of the guide 301.

Sensors 302 and 303 are length detection sensors for detecting a sub scanning length of the documents placed on the document stacking unit 202. For example, the sensors 302 and 303 are arranged to protrude from the top surface of the document stacking unit 202. The sensors 302 and 303 output ON if they are slid down when placing a document. On the other hand, the sensors 302 and 303 output OFF if they are not slid down. The CPU 111 detects the sub scanning width of the documents in three levels of resolution based on the outputs of the sensors 302 and 303.

According to the present exemplary embodiment the sensors 302 and 303 are used to detect the sub scanning width of the documents. However, this is not restrictive. For example, a detection method for optically detecting the presence or absence of a document may be used.

FIG. 4 is a diagram illustrating an example of a condition table for detecting the size of a document. The CPU 111 refers to the condition table of FIG. 4 to detect a size based on the detection values of the width detection sensor, the sensor 302, and the sensor 303. As employed herein, the size of a document that is placed with its shorter side in a direction parallel to the foregoing reading line will be referred to as an R size (such as A5R and A4R). The size of a document that is placed with its longer side in the direction parallel to the reading line will be expressed like A5 and A4. The sizes of long documents of the A and B series will be referred to as long size (such as A3 long and B4 long). In a case of reading of standard size, A3 long is read as A3R standard size. In a case of reading long size, A3 long is read as a long document having an A3 width. Similarly, in a case of reading standard size, B4 long is read as B4R standard size. In a case of reading long size, B4 long is read as a long document having a B4 width.

For example, if an output value detected by the width detection sensor indicates a main scanning width of 263.5 mm or more and both the sensors 302 and 303 are ON, the CPU 111 determines that the size is A3 long (a main scanning width of 297 mm and a sub scanning width of 420 mm or more). If the output value detected by the width detection sensor indicates a main scanning width of 263.5 mm or more and both the sensors 302 and 303 are OFF, the CPU 111 determines that the size is A4 (a main scanning width of 297 mm and a sub scanning width of 210 mm).

In such a manner, if the documents placed on the document stacking unit 202 have the same main scanning width, the CPU 111 determines whether the documents are portrait or landscape depending on whether the sensors 302 and 303 are slid down.

If the user places a curled document or a bent Z-folded document on the document stacking unit 202, the trailing edge of the document may float and the sensor 302 or 303 are not slid down. In such a case, the CPU 111 determines that a portrait document of half the size, not the size of the actually-placed document, is placed.

While the present exemplary embodiment describes only the A and B size system as an example, the inch size system or a combination of the A, B, and inch size systems can be detected by a similar mechanism. For example, the CPU 111 detects the inch size system by referring to a condition table for the inch size system. The CPU 111 can detect the combination of the A, B, and inch size system by referring to a condition table for the combined system.

<Reading Processing of Document>

If the user starts to use the MFP 101, a screen (not illustrated) for setting execute target processing is displayed. The user selects a function such as the transmission function and the copy function via the operation unit 116, and makes the MFP 101 execute the processing.

Figure 5:
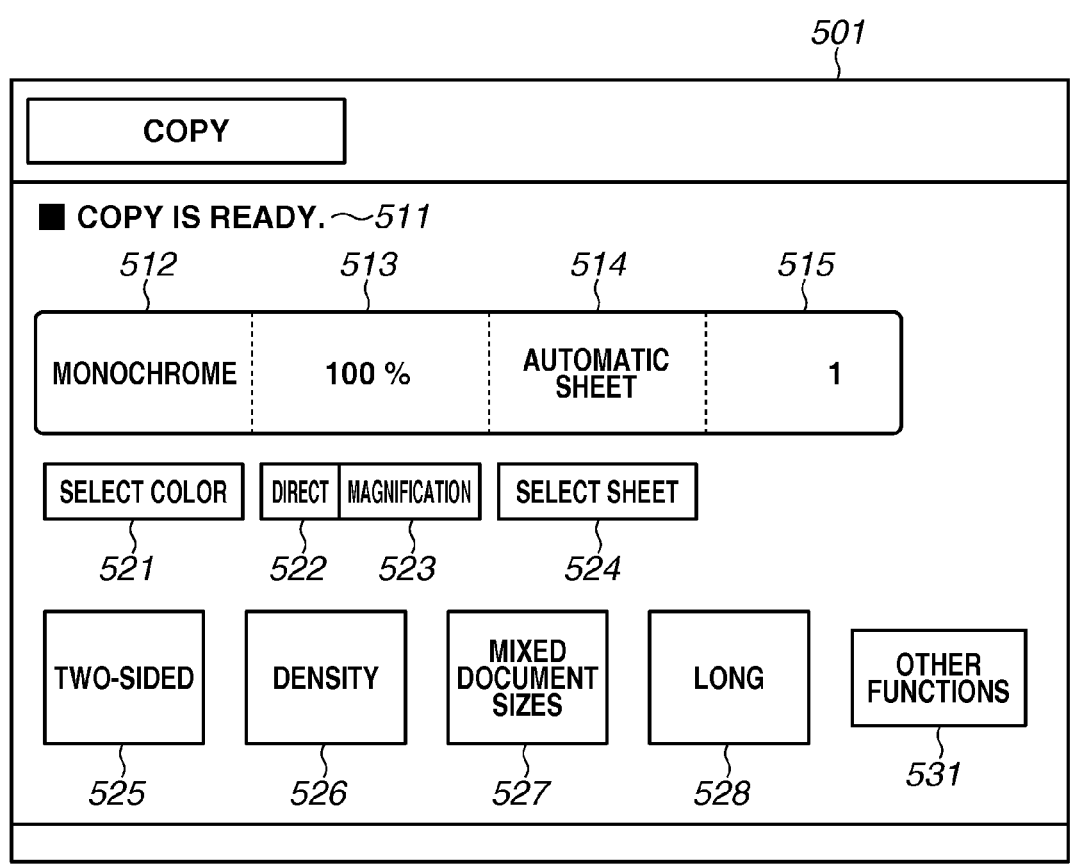
FIG. 5 is a diagram illustrating an operation screen of the MFP.

A description will be given below by using the copy function as an example of reading processing of a document. FIG. 5 is a diagram illustrating an example of a screen displayed on the operation unit 116 of the MFP 101. The user can make an output setting via the touch panel of the operation unit 116. Information 511 is displayed to notify that a start key provided as a hardware key outside the screen can be pressed to start executing copy processing. Information 515 is displayed to notify of the number of copies to be printed. The user can input the number of copies to be printed via a numerical keypad which is provided as hardware keys outside the screen.

An operation key 521 is a key to be used when selecting output color of a print product. An operation key 522 is a key to be used when setting the magnification of the print product to same size relative to the size of the document. An operation key 523 is a key to be used when arbitrarily changing the magnification of the print product relative to the size of the document. An operation key 524 is a key to be used when selecting a sheet to be used for printing. Pieces of information 512 to 514 are displayed to notify the user of a copy-related setting state set by using the operation keys 521 to 524.

An operation key 525 is a key to be used when setting whether to read one side of the document or both sides of the document. An operation key 526 is an operation key to be used when changing density of the print product.

An operation key 527 is a key to be used when reading a stack of mixed documents of different sizes (hereinafter, mixed documents). To read mixed documents, the user presses the operation key 527 to set a mixed document mode ON. An operation key 528 is a key to be used when reading a document which is longer than a standard size (hereinafter, long document). To read a long document, the user presses the operation key 528 to set a long size mode ON.

Various settings are available for the copy function. The settings include page printing, page aggregation, and bookbinding, for example. An operation key 531 is a key to be used when making other settings not displayed on a copy screen 501. The user can press the operation key 531 to change various settings of the copy function.

Figure 6:
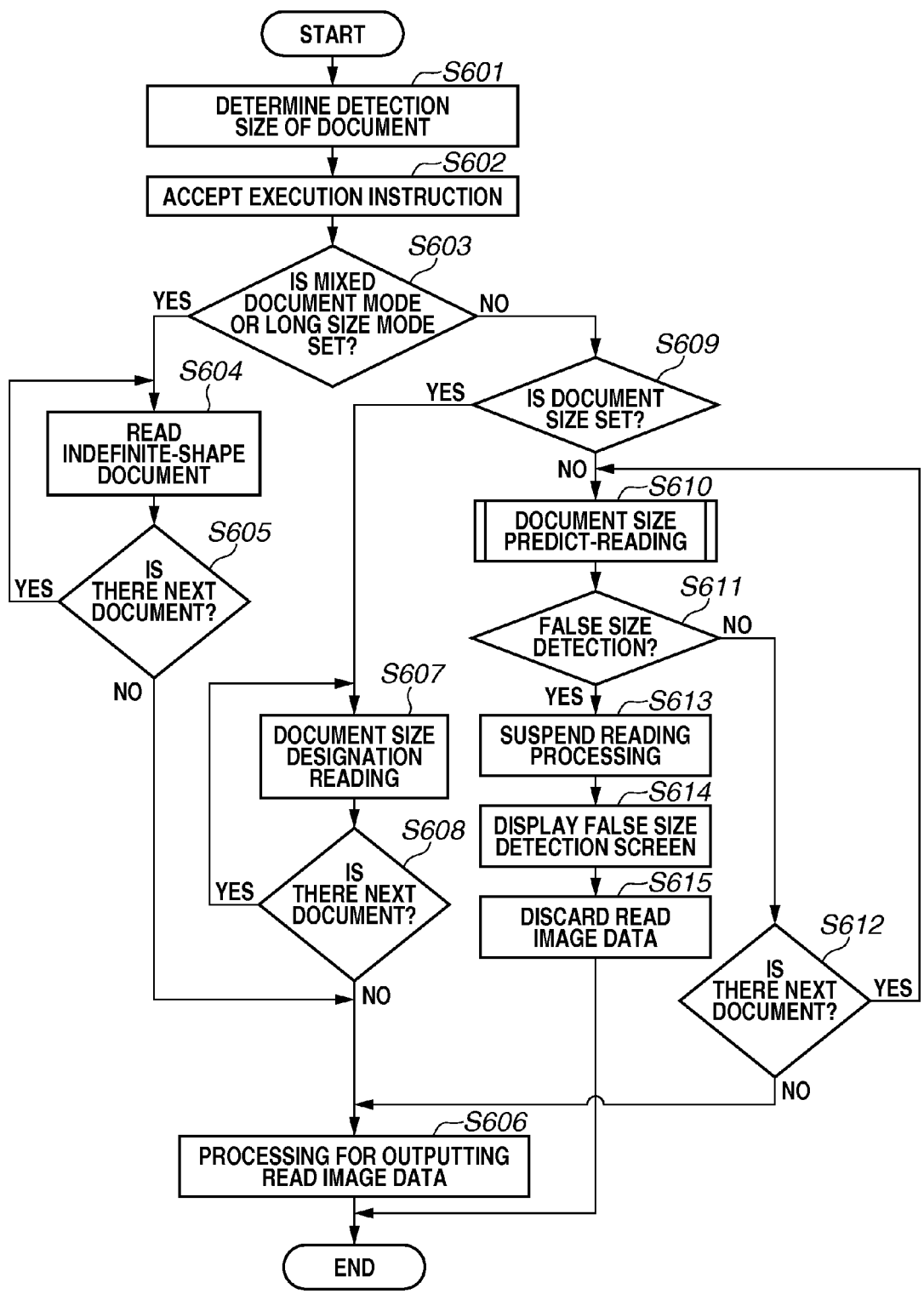
FIG. 6 is a flowchart illustrating operations related to reading processing of the MFP.
Figure 7:
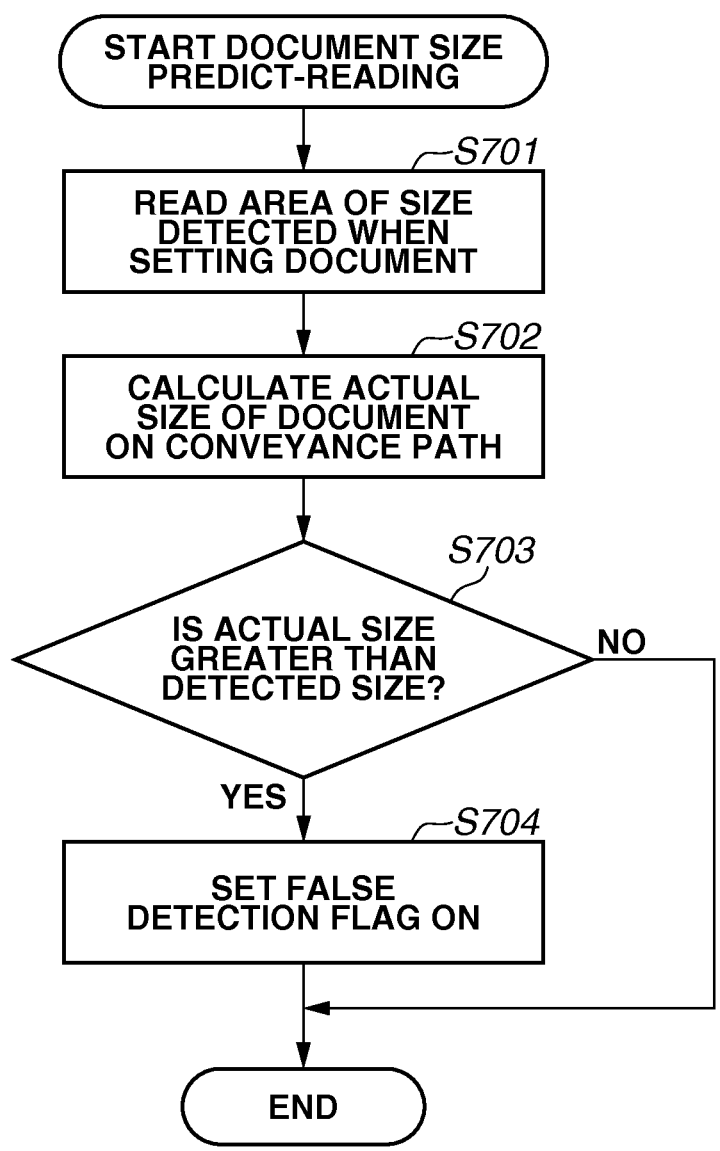
FIG. 7 is a flowchart illustrating operations related to the reading processing of the MFP.

FIGS. 6 and 7 are flowcharts for describing operations related to the reading processing of the MFP 101. The operations (steps) illustrated in the flowcharts of FIGS. 6 and 7 are implemented by the CPU 111 of the MFP 101 reading a control program stored in the ROM 112 or the storage 114 into the RAM 113 and executing the control program.

In step S601, the CPU 111 determines a detection size of a document placed on the document stacking unit 202. The CPU 111 obtains the output values of the width detection sensor and the sensors 302 and 303. Using the obtained output values as a condition, the CPU 111 searches the condition table illustrated in FIG. 4 to obtain a detection size applicable to the condition. The determination of the detection size in step S601 is not limited to a process performed by such timing. For example, the detection size may be determined each time the output value of a sensor varies. Or else, the determination may be made only once in response to an execution instruction in step S602 as a trigger.

In step S602, the CPU 111 accepts an execution instruction given by the user pressing the start key (not illustrated) provided on the operation unit 116. Accepting the execution instruction, the CPU 111 generates a read job. The processing proceeds to reading processing of step S603 and subsequent steps.

In step S603, the CPU 111 determines whether either the mixed document mode or the long size mode is set. If it is determined that the mixed document mode or the long size mode is set (YES in step S603), the processing proceeds to step S604 to read an indefinite-shape document. If it is determined that neither of the mixed document mode and the long size mode is set (NO in step S603), the processing proceeds to step S609.

The case where the mixed document mode or the long size mode is set will initially be described. In step S604, the CPU 111 reads the document placed on the document stacking unit 202 as the document of an indefinite-shape size. When reading the document as having an indefinite-shape size, the scanner 120 starts to read and generate image data without fixing the size of the document. When reading the document of indefinite size, the CPU 111 corrects the size by using the length of the document detected in the conveyance path of the ADF 124. The CPU 111 performs image processing such as variable magnification and frame removal on the generated image data before storing the image data into the storage 114 or the RAM 113. After the completion of the reading of the document, the processing proceeds to step S605. In step S605, the CPU 111 determines whether there is a next document on the document stacking unit 202. If it is determined that there is a next document (YES in step S605), the processing returns to step S604 to read the next document. If it is determined that there is no next document (all the documents have been read) (NO in step S605), the processing proceeds to step S606. Note that if the mixed document mode or the long size mode is set, the document is read at a reduced conveyance speed as compared to when reading a document of standard size. The reading speed becomes thus slower than with the standard size.

In step S606, the CPU 111 performs processing for outputting the read image data. In the case of the copy processing illustrated in FIG. 5, the CPU 111 controls the printer 118 to start processing for printing the image data stored in the storage 114 or the RAM 113 onto a sheet or sheets. When the number of copies as set by the user has been printed, the CPU 111 ends the output processing.

In step S609, the CPU 111 determines whether a document size is set. The CPU 111 obtains information about whether a document size is set via the operation unit 116. If the obtained information indicates that there is an explicit size setting (YES in step S609), the processing proceeds to step S607 to perform document size designation reading. If there is no explicit size setting (NO in step S609), the processing proceeds to step S610 to perform document size prediction reading. In step S607, the CPU 111 reads the document placed on the document stacking unit 202 as the document having a standard size. When reading the document as the document having a standard size, the scanner 120 reads an area corresponding to the size set via the operation unit 116 and generates image data regardless of the size of the document actually placed. The document read by the reading unit 2021 is sequentially discharged to the discharge unit 201. After the completion of the reading of the document, the processing proceeds to step S608. In step S608, the CPU 111 determines whether there is a next document. If it is determined that there is a next document (YES in step S608), the processing returns to step S607 to read the next document. If it is determined that there is no next document (NO in step S608), the processing proceeds to step S606. In step S606, the CPU 111 outputs the image data, and the processing ends.

<Document Size Prediction Reading>

In step S609, if it is determined that there is no size setting (NO in step S609), the processing proceeds to step S610 to perform the document size prediction processing. The processing of step S610 will be described with reference to the flowchart of FIG. 7.

In step S701, the CPU 111 reads the area corresponding to the detection size determined in step S601 to generate image data. In step S702, the CPU 111 calculates the actual size of the document on the conveyance path of the ADF 124.

In step S703, the CPU 111 determines whether the actual size calculated in step S702 is greater than the detection size obtained in step S601. If the actual size is determined to be greater than the detection size (YES in step S703), the processing proceeds to step S704. In step S704, the CPU 111 sets a false detection flag to ON. If the actual size is not determined to be greater than the detection size (NO in step S703), the processing proceeds to step S611. Specifically, if the length of the document actually conveyed is greater than the sub scanning width of the detection size, and a difference therebetween is greater than or equal to a threshold set for the image reading apparatus in advance (for example, 20 mm), the CPU 111 determines that the actual size is greater than the detection size.

In the document size prediction reading of the present exemplary embodiment, the CPU 111 performs false detection processing only if the actual document length is greater than the detection size. The reason is that if the actual document length is greater than the detection size, only a part of the area of the actual document is read, which possibly causes an image loss. On the other hand, if the actual document length is smaller than the document length based on the detection size, image data is generated to include both the entire area of the actual document and an area of blank part conveyance after the trailing edge of the document has passed the reading unit 2021. In such a case, there occurs no image loss, and the CPU 111 therefore does not perform the false detection processing.

In the present exemplary embodiment, the CPU 111 performs the document size prediction reading if neither of the mixed document mode and the long size mode is set and no document size is designated by the user. However, this is not restrictive. If a document size is designated by the user, the CPU 111 determines the document size before starting to read a document, and reads the document based on the determined document size. The CPU 111 here may perform the operation for the document size prediction reading. In such a case, if NO in step S603, the processing may skip the determination of step S609 and proceed to step S610.

<White Filling Processing of Image Data>

In the present exemplary embodiment, processing for filling image data outside a document area with white (hereinafter, white filling control) may be performed when reading a document of standard size (steps S607 and S610). The processing is performed to prevent an image of stains on a scanner counter surface (for example, the conveyance drum 2015) outside the document area from being captured when mixed documents are read if the user does not set the mixed document mode.

If the user does not set the mixed document mode, the scanner 120 generates image data of the document size detected on the document stacking unit 202 (or the document size designated by the user).

Specifically, when the control CPU of the scanner 120 detects the leading edge of a document by the sensor 2022, the control CPU starts measuring an activation clock. If the control CPU has counted a predetermined number of driving clocks for conveying the document to the document reading position, the control CPU starts to read the document.

The following description deals with a case where the conveyance drum 2015 rotates by a rotation distance of 0.04233 mm (=measure of a single pixel in a resolution of 600 dpi) each time a driving clock occurs. The rotation distance of the conveyance drum 2015 refers to the distance which the conveyance drum 2015 rotates. If the document size detected on the document stacking unit 202 (or the document size designated by the user) is A4 (with a main scanning width of 210 mm and a sub scanning width of 297 mm), the following equation holds:

$$297 \div 0.04233 = 7016.3 \ldots \approx 7017 [\text{clocks}]$$

In other words, image data of A4 size can be obtained by reading the document until 7017 driving clocks are counted from the start of reading the document.

Suppose that the user places mixed documents without setting the mixed document mode. In such a case, a document (for example, A5R with a main scanning width of 210 mm and a sub scanning width of 148 mm) smaller than the detected document size (or the document size designated by the user) can be stacked in a mixed manner.

When reading the document (A5R) smaller than the detected document size, the reading unit 2021 reads image data even after reading the area from the leading edge to the trailing edge of the document. After the trailing edge of the document has passed the reading position, the light emitted from the optical unit 2009 is reflected by the scanner counter surface (for example, the conveyance drum 2015), whereby image data of the scanner counter surface is generated. In such a case, an image of stains adhering to the conveyance drum 2015 may be captured, which is reflected on the image data. To avoid this phenomenon, after the trailing edge of the document is detected, the control CPU performs the white filling control on the pixel area subsequent to the trailing edge of the document.

Specifically, the control CPU detects the trailing edge of the document when the sensor 2022 changes from ON to OFF. If the trailing edge of the document is detected, the control CPU performs the white filling control at timing that the document has been conveyed by approximately 10 mm after reading the trailing edge of the document by the reading unit 2021.

The control CPU generates the image data by replacing data obtained from the CCD image sensor 2007 with pixel data of white level (RGB=255, 255, 255) at the timing that the document has been conveyed by approximately 10 mm from the trailing edge of the document after reading the trailing edge of the document by the reading unit 2021. The control CPU ends the reading of the image data when 7017 driving clocks have been counted from the start of the reading of the document.

Such a mechanism can prevent the image of stains of the scanner counter surface from being captured when reading a document having a sub scanning width smaller than the detection size detected by the document stacking unit 202.

Return to the description of FIG. 6. In step S611, the CPU 111 determines whether a false size detection has occurred. If the false detection flag is ON, the CPU 111 determines that a false size detection has occurred (YES in step S611), and the processing proceeds to error processing of step S613 and subsequent steps. If the false detection flag is not ON (NO in step S611), the processing proceeds to step S612. In step S612, the CPU 111 determines whether there is a next document. If it is determined that there is a next document (YES in step S612), the processing returns to step S610 to read the next document. If it is determined that there is no next document (NO in step S612), the processing proceeds to step S606. In step S606, the CPU 111 outputs the image data, and the processing ends.

In step S613, the CPU 111 discharges the document being conveyed by the scanner 120, and suspends the reading processing. In step S614, the CPU 111 displays a false size detection screen on the operation unit 116.

Figure 8:
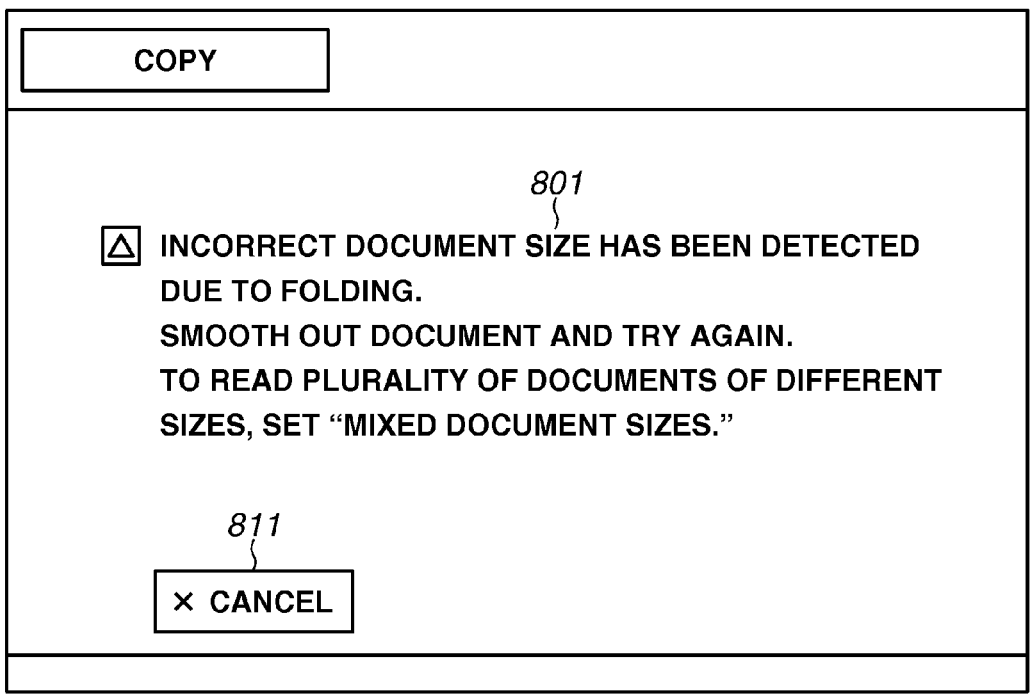
FIG. 8 is a diagram illustrating an operation screen of the MFP.

FIG. 8 is a diagram illustrating an example of the false size detection screen displayed on the operation unit 116 of the MFP 101. Information 801 is information for notifying the user that the processing is suspended due to a false size detection. An operation key 811 is a key for cancelling the reading of the document. If the operation key 811 on the false size detection screen illustrated in FIG. 8 is pressed, the processing proceeds to step S615. If the operation key 811 is not pressed, the CPU 111 continues making the notification of the false size detection.

Return to the description of FIG. 6. In step S615, the CPU 111 discards the read image data, and the processing ends.

As described above, according to the present exemplary embodiment, if the size of a document identified before a start of conveyance is smaller than the size identified after the start of conveyance, image data in which part of the document is missing can be prevented from being output without the user being aware of it. If the size of the document identified before the start of conveyance is greater than the size identified after the start of conveyance, image data including the entire image on the document can be generated. According to the present exemplary embodiment, the user's convenience can thus be improved while preventing the image data in which a part of the document is missing, from being output without the user being aware of it.

Moreover, according to the present exemplary embodiment, if the size of a document is identified before a start of conveyance and conveyance of the document starts to read an image, the area outside the document area can be filled with white.

Next, a second exemplary embodiment will be described. The first exemplary embodiment has dealt with an example where if the size of a document is identified before a start of conveyance and then the conveyance of the document starts to read an image, the user's convenience is improved while preventing image data in which part of the document is missing from being output without the user being aware of it. The second exemplary embodiment deals with an example where if a false size detection is detected, the document is re-read in a correct size. A detailed description of a configuration similar to that of the first exemplary embodiment will be omitted.

FIG. 9 is a flowchart for describing operations related to the reading processing of the MFP 101 according to the second exemplary embodiment. The operations (steps) illustrated in the flowchart of FIG. 9 are implemented by the CPU 111 of the MFP 101 reading a control program stored in the ROM 112 or the storage 114 into the RAM 113 and executing the control program.

The document reading processing from steps S901 to S910 is similar to that of steps S601 to S610 according to the first exemplary embodiment. A description thereof is thus omitted. In step S911, the CPU 111 determines whether a false size detection has occurred. If the false detection flag is ON, the CPU 111 determines that a false size detection has occurred (YES in step S911), and the processing proceeds to step S912. If the false detection flag is not ON (NO in step S911), the processing proceeds to step S915. In step S915, the CPU 111 determines whether there is a next document. If it is determined that there is a next document (YES in step S915), the processing proceeds to step S910 to read the next document. If it is determined that there is no next document (NO in step S915), the processing proceeds to step S906. In step S906, the CPU 111 outputs the image data, and the processing ends.

In step S912, the CPU 111 determines whether pieces of image data of different sizes can be output. Specifically, the CPU 111 determines whether a function not combinable with the mixed document mode is set. For example, if a function supposed to read and process a plurality of documents of the same size is set, the CPU 111 determines that a function not combinable with the document reading in the mixed document mode is set. Specific examples of such a function include automatic rotation, reduction layout, bookbinding and layout printing, page aggregation, and image repeating.

If a function not combinable with the mixed document mode is set (NO in step S912), the processing proceeds to error processing of step S916 and subsequent steps. If none of the functions not combinable with the mixed document mode is set (YES in step S912), the processing proceeds to step S913.

In step S913, the CPU 111 performs a document reversing operation. Similar to a case of reading a two-sided document, the CPU 111 detects the trailing edge of the document by using the sensor 2023 which is arranged on the conveyance path of the ADF 124. The CPU 111 stops the conveyance motor after the detected document is conveyed to the reversing position R. The CPU 111 then drives the conveyance motor to rotate reversely, whereby the document is conveyed again in the reversed conveyance direction. The document is fed along the flapper 2020 toward the reversing roller 2019. The document is passed over the surface of the document positioning glass plate 2001 along the outer periphery of the conveyance drum 2015 and conveyed to the reversing position R. Here, since the back side of the document is passed over the surface of the document positioning glass plate 2001, the reading unit 2021 does not read the document.

In step S914, the CPU 111 re-reads the document in the actual document size. The CPU 111 reverses the document reversed in step S913 again, and reads the document in the document size based on the actual document length calculated on the conveyance path of the ADF 124. After the completion of the reading of the document, the processing proceeds to step S915. In step S915, the CPU 111 determines whether there is a next document. If it is determined that there is a next document (YES in step S915), the processing returns to step S910 to resume reading a document in the standard size. If it is determined that there is no next document (NO in step S915), the processing proceeds to step S906. In step S906, the CPU 111 outputs the image data, and the processing ends.

In steps S916 to S918, the CPU 111 performs error processing similar to that of steps S613 to S615 according to the first exemplary embodiment, and the processing ends.
<Modification of Re-Reading>

In the present exemplary embodiment, in steps S913 and S914, the CPU 111 reverses and re-reads the document in the correct size. Instead, the CPU 111 may perform re-reading based on the following processing.

Figure 10A:
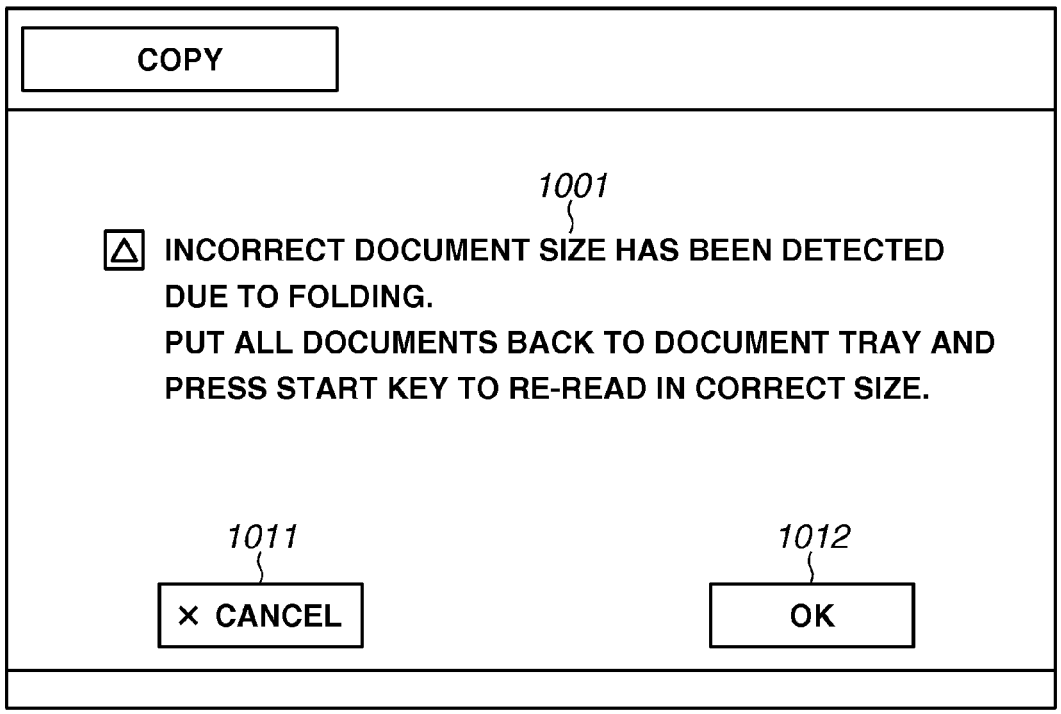
FIGS. 10A and 10B are diagrams illustrating an operation screen of the MFP.
Figure 10B:
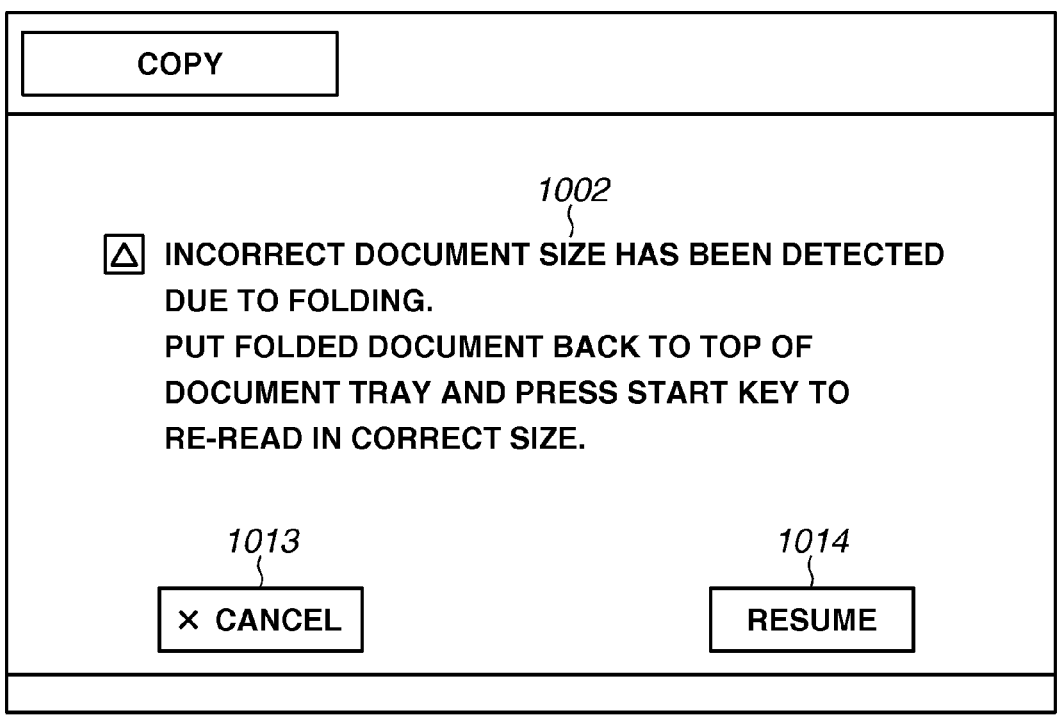

FIGS. 10A and 10B are diagrams illustrating examples of a re-reading screen displayed on the operation unit 116 of the MFP 101. If, in step S912, the CPU 111 determines that documents of different sizes can be output, the CPU 111 suspends the processing and discharges the document being conveyed, from the ADF 124 to the discharge unit 201. The CPU 111 displays the re-reading screen illustrated in FIG. 10A on the operation unit 116. Information 1001 is information for notifying the user to place all the documents on the document stacking unit 202 again. An operation key 1011 is an operation key for cancelling the reading of the documents. If the operation key 1011 on the re-reading screen illustrated in FIG. 10A is pressed, the processing proceeds to step S918. In step S918, the CPU 111 discards the read image data, and the processing ends. On the other hand, if an operation key 1012 is pressed, the CPU 111 automatically sets the mixed document mode and starts the reading processing of the documents.

Instead of re-reading all the documents, the CPU 111 may change to the mixed document mode in the middle of the processing and read a document. In such a case, the CPU 111 displays the re-reading screen illustrated in FIG. 10B on the operation unit 116 instead of the re-reading screen illustrated in FIG. 10A. Information 1002 is information for notifying the user to place the document causing the false detection on top of a document yet to be read. An operation key 1013 is an operation key for cancelling the reading of the documents. If the operation key 1013 on the re-reading screen illustrated in FIG. 10B is pressed, the processing proceeds to step S918. In step S918, the CPU 111 discards the read image data, and the processing ends. If an operation key 1014 is pressed, the CPU 111 changes to the mixed document mode and starts the reading processing of the documents.

The re-reading may be modified so that if, in step S912, a function not combinable with the mixed document mode is determined to be set, the CPU 111 performs re-reading processing including variable magnification without cancelling the processing. If a function not combinable with the mixed document mode is determined to be set, the CPU 111 obtains image data in the correct document size like steps S913 and S914. The CPU 111 then performs reduction/variable magnification processing to make the obtained image data into the detection size.

As described above, according to the present exemplary embodiment, if the image reading apparatus performs processing for reading a document in a standard size and a function supposed to read and process documents of the same size is not set, the image reading apparatus can re-read the document in a correct size. If a function supposed to read and process documents of the same size is set, image data in which part of a document is missing can be prevented from being output without the user being aware of it.

Further, in the present exemplary embodiment, if a function supposed to read and process documents of the same size is set, appropriate variable magnification processing can be performed so that image data in which part of a document is missing will not be output.

<Other Exemplary Embodiments>

In the above-described exemplary embodiments, a method for feeding-reading the documents at a fixed reading position has been described. However, these exemplary embodiments are not seen to be limiting. For example, another reading method is also applicable. According to this reading method, a document is placed on the document stacking unit 202 onto the document positioning glass plate 2001 by using a belt, the conveyance is once stopped, the document placed on the document positioning glass plate 2001 is read while moving the optical unit 2009, and the document is discharged after the completion of the reading.

While the above-described exemplary embodiments have been described in detail, various modifications and changes may be made.

As described above, according to the exemplary embodiments, the user's convenience can be improved by performing different processes between a case where the size of a document identified before a start of conveyance is greater than the size identified after the start of conveyance, and a case where the size of the document identified before the start of conveyance is smaller than the size identified after the start of conveyance.

OTHER EMBODIMENTS

Additional exemplary embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting.

This application claims the benefit of Japanese Patent Application No. 2014-149936, filed Jul. 23, 2014, which is hereby incorporated by reference herein in its entirety.

What is claimed is:

1. An image reading apparatus comprising:
a reading unit configured to read an image on a document to generate image data;
a document conveyance unit configured to convey the document to the reading unit;
a first identification unit configured to identify a size of the document before the document conveyance unit starts conveying the document;
a reading control unit configured to control the reading unit to read the document, based on the size identified by the first identification unit; and
a second identification unit configured to identify a size of the document after the document conveyance unit starts conveying the document,
wherein the reading control unit is configured to perform control to, in a case where the size identified by the first identification unit is smaller than the size identified by the second identification unit, cancel reading processing and, in a case where the size identified by the first identification unit is greater than the size identified by the second identification unit, continue the reading processing.

2. The image reading apparatus according to claim 1, wherein the reading control unit is configured to provide, in the case where the size identified by the first identification unit is smaller than the size identified by the second identification unit, a predetermined notification to an operation unit.

3. The image reading apparatus according to claim 1, wherein the reading control unit is configured to control, in a case where a size of a document to be read is set by a user, the reading unit to read the document in the size set by the user regardless of the size identified by the first identification unit.

4. The image reading apparatus according to claim 1, further comprising a detection unit configured to detect a leading edge and a trailing edge of the document being conveyed by the document conveyance unit,
wherein the second identification unit is configured to identify a size of the document in a conveyance direction based on timing that the leading edge and the trailing edge of the document are detected by the detection unit and on a speed at which the document conveyance unit conveys the document.

5. The image reading apparatus according to claim 4, wherein the reading control unit is configured to fill, in a case where the detection unit detects the trailing edge of the document before reading of the image data of a size to be read is finished, an area subsequent to the trailing edge of the document with white pixel data.

6. The image reading apparatus according to claim 1, further comprising an output unit configured to output the image data based on an output setting made by a user,
wherein the reading control unit is configured to, in a case where in output processing by the output unit pieces of image data of different sizes can be output and the size identified by the second identification unit is greater than the size identified by the first identification unit, control the document conveyance unit to convey the document again and control the reading unit to re-read the document in the size identified by the second identification unit.

7. The image reading apparatus according to claim 1, further comprising a second reading control unit configured to control the document conveyance unit to convey the document and to control the reading unit to read the document in the size identified by the second identification unit.

8. The image reading apparatus according to claim 7, wherein in a case where a setting to read the document in a mixed document mode or a long size mode is made by a user, the document is read based on the second reading control unit.

9. The image reading apparatus according to claim 1, further comprising:
a document stacking unit on which to place a document to be conveyed to the document conveyance unit;
at least one width detection sensor configured to detect a width of the document placed on the document stacking unit; and
at least one length detection sensor configured to detect a length of the document placed on the document stacking unit,
wherein the first identification unit is configured to identify, based on the at least one width detection sensor and the at least one length detection sensor, the size of the document placed on the document stacking unit.

10. A method for controlling an image reading apparatus, the method comprising:
reading an image on a document to generate image data;
conveying the document;
identifying, as a first identification, a size of the document before starting to convey the document;
controlling to read the document, based on the size identified by the first identification; and
identifying, as a second identification, a size of the document after starting to convey the document,
wherein controlling to read the document includes performing control to, in a case where the size identified by the first identification is smaller than the size identified by the second identification, cancel reading processing and, in a case where the size identified by the first identification is greater than the size identified by the second identification, continue the reading processing.

11. A non-transitory computer-readable storage medium storing computer executable instructions for causing a computer to perform a method for controlling an image reading apparatus, the method comprising:
reading an image on a document to generate image data;
conveying the document;

identifying, as a first identification, a size of the document before starting to convey the document;
controlling to read the document, based on the size identified by the first identification; and
identifying, as a second identification, a size of the document after starting to convey the document,
wherein controlling to read the document includes performing control to, in a case where the size identified by the first identification is smaller than the size identified by the second identification, cancel reading processing and, in a case where the size identified by the first identification is greater than the size identified by the second identification, continue the reading processing.

* * * * *